United States Patent
Yan

(10) Patent No.: US 11,599,794 B1
(45) Date of Patent: Mar. 7, 2023

(54) SYSTEM AND METHOD FOR TRAINING SAMPLE GENERATOR WITH FEW-SHOT LEARNING

(71) Applicant: MOFFETT INTERNATIONAL CO., LIMITED, Hong Kong (HK)

(72) Inventor: Enxu Yan, Los Altos, CA (US)

(73) Assignee: Moffett International Co., Limited, Hong Kong (HK)

( * ) Notice: Subject to any disclaimer, the term of this patent is extended or adjusted under 35 U.S.C. 154(b) by 0 days.

(21) Appl. No.: 17/506,317

(22) Filed: Oct. 20, 2021

(51) Int. Cl.
G06N 3/08 (2006.01)
G06N 3/04 (2006.01)

(52) U.S. Cl.
CPC ............ G06N 3/08 (2013.01); G06N 3/0427 (2013.01); G06N 3/0454 (2013.01)

(58) Field of Classification Search
CPC .............................. G06N 3/08; G06N 3/0454
See application file for complete search history.

(56) References Cited

U.S. PATENT DOCUMENTS

| | | |
|---|---|---|
| 2018/0005136 A1 | 1/2018 | Gai et al. |
| 2019/0122120 A1 | 4/2019 | Wu et al. |
| 2019/0188516 A1* | 6/2019 | Porter .................. G06V 10/764 |
| 2019/0205748 A1* | 7/2019 | Fukuda ..................... G06N 3/08 |
| 2019/0332667 A1 | 10/2019 | Williams et al. |
| 2020/0125956 A1 | 4/2020 | Ravi et al. |
| 2020/0312336 A1* | 10/2020 | Kang ........................ G06N 3/08 |
| 2021/0124881 A1 | 4/2021 | Li et al. |
| 2021/0125033 A1* | 4/2021 | Zhou ...................... G06N 3/063 |
| 2021/0150330 A1* | 5/2021 | Sharma .................... G06N 3/08 |
| 2021/0150340 A1 | 5/2021 | Liu et al. |
| 2021/0192357 A1 | 6/2021 | Sinha et al. |

(Continued)

FOREIGN PATENT DOCUMENTS

| | | |
|---|---|---|
| CN | 112381209 A | 2/2021 |
| CN | 112988975 A | 6/2021 |

(Continued)

OTHER PUBLICATIONS

Turc et al., "Well-Read Students Learn Better: on the Importance of Pre-Training Compact Models", Sep. 2019 (Year: 2019).*

(Continued)

*Primary Examiner* — Omar F Fernandez Rivas
*Assistant Examiner* — Selene A. Haedi
(74) *Attorney, Agent, or Firm* — Sheppard Mullin Richter & Hampton LLP

(57) ABSTRACT

Methods, systems, and apparatus, including computer programs encoded on computer storage media, for few-shot learning-based generator training are disclosed. An exemplary method may start with obtaining a teacher model and a plurality of training samples, as well as a generator for generating more training samples. After generating a plurality of additional training samples using the method may continue with feeding the plurality of generated additional training samples into the teacher model to obtain a plurality of first statistics; and feeding the plurality of training samples into the teacher model to obtain a plurality second statistics. Then the method further includes training the generator to minimize a distance between the plurality of first statistics and the plurality of second statistics.

17 Claims, 10 Drawing Sheets

(56) References Cited

U.S. PATENT DOCUMENTS

| | | | |
|---|---|---|---|
| 2021/0286270 A1 | 9/2021 | Middlebrooks et al. | |
| 2021/0295173 A1* | 9/2021 | Choi | G06N 3/088 |
| 2021/0383238 A1* | 12/2021 | Jafari | G06F 40/284 |
| 2022/0076136 A1* | 3/2022 | Passban | G06N 3/0454 |
| 2022/0138633 A1* | 5/2022 | Choi | G06N 20/20 706/12 |
| 2022/0157458 A1 | 5/2022 | Mohiuddin et al. | |

FOREIGN PATENT DOCUMENTS

| | | | | |
|---|---|---|---|---|
| CN | 113255822 A | 8/2021 | | |
| CN | 113435568 A | 9/2021 | | |
| WO | WO-2022051856 | * | 3/2022 | G06N 3/08 |

OTHER PUBLICATIONS

Yin et al., "Dreaming to Distill: Data-free Knowledge Transfer via DeepInversion", Jun. 2020 (Year: 2020).*

Zhong et al., "Recovery Guarantees for One-hidden-layer Neural Networks", Jun. 2017 (Year: 2017).*

Zhang et al. "MetaGAN: An Adversarial Approach to Few-Shot Learning", 2018 (Year: 2018).*

Iqbal et. all. "Generative Adversarial Network for Medical Images (MI-GAN)", 2018 (Year: 2018).*

Al-Tahmeesschi et. al., "Feature-Based Deep Neural Networks for Short-Term Prediction of WiFi Channel Occupancy Rate", Jun. 2021 (Year: 2021).*

Rajasegaran et al., "Self-supervised Knowledge Distillation for Few-shot Learning", Aug. 2020 (Year: 2020).*

Chawla et al., "Data-Free Knowledge Distillation for Object Detection." Proceedings of the IEEE/CVF Winter Conference on Applications of Computer Vision, 2021, 10 pages.

Ji et al., "DAFL: Deep Adaptive Feature Fearning for Network Anomaly Detection." IFIP International Conference on Network and Parallel Computing. Springer, Cham, 2019, p. 350-354.

Luo et al., "Large-scale generative data-free distillation." arXiv preprint arXiv:2012.05578, 2020, 12 pages.

Turc et al., "Well-Read Students Learn Better: On the Importance of Pre-Training Compact Models", arXiv: 1908.08962v2, Sep. 2019, 13 pages.

Non-Final Office Action dated Feb. 14, 2022, issued in related U.S. Appl. No. 17/519,965 (29 pages).

Final Office Action dated Jun. 17, 2022, issued in related U.S. Appl. No. 17/519,965 (32 pages).

Notice of Allowance dated Oct. 5, 2022, issued in related U.S. Appl. No. 17/519,965 (8 pages).

Benjamin Bustos et. al., "Pivot selection techniques for proximity searching in metric spaces", Pattern Recognition Letters 24, 2003, pp. 2357-2366.

Radu Jianu et. al. "Exploring Brain Connectivity with Two-Dimensional Neural Maps", IEEE Transactions on Visualization and Computer Graphics, vol. 18, No. 6, Jun. 2012, pp. 978-987.

Themos Stafylakis et. al. "Speaker Embeddings by Modeling Channel-wise Correlations", arXiv:2104.02571v2 [eess.AS], Jul. 7, 2021.

Christos Chatzikonstantinou et. al., "Neural Network Compression Using Higher-Order Statistics and Auxiliary Reconstruction Losses", CVPR Workshop, 2020.

PCT International Search Report and the Written Opinion dated Dec. 21, 2022, issued in related International Application No. PCT/CN2022/126138 (10 pages).

* cited by examiner

SYSTEM AND METHOD FOR TRAINING SAMPLE GENERATOR WITH FEW-SHOT LEARNING

TECHNICAL FIELD

The disclosure generally relates to training of artificial intelligence (AI), more particularly to training a sample generator with few-shot learning for knowledge distillation.

BACKGROUND

In machine learning, knowledge distillation refers to transferring knowledge from a large model to a smaller one. The large model is usually called a teacher model, while the smaller model is usually called a student model. Knowledge distillation transfers knowledge learned by the teacher model from a large volume of training samples into the student model without loss of validity. Meanwhile, the student model has a much smaller footprint and is less expensive to evaluate and deploy.

Knowledge distillation involves training the student model to generate similar output as the teacher model does. This training process requires training samples. Theoretically, the training samples can be obtained by accessing the original or augmented training samples that trained the teacher model. However, this is usually problematic in practice due to privacy, proprietary, and availability concerns. To tackle this practical problem, this disclosure describes a few-shot learning based method for training a generator to generate training samples for knowledge distillation.

SUMMARY

Various embodiments of the present specification may include systems, methods, and non-transitory computer-readable media for training sample generator with few-shot learning.

According to one aspect, the method for training sample generator with few-shot learning may include: obtaining a teacher model and a plurality of training samples; generating a plurality of samples using a generator; feeding the plurality of generated samples into the teacher model to obtain a plurality of first statistics; feeding the plurality of training samples into the teacher model to obtain a plurality second statistics; and training the generator to minimize a distance between the plurality of first statistics and the plurality of second statistics.

In some embodiments, the method may further include: performing knowledge distillation from the teacher model to a student model using the trained generator.

In some embodiments, the feeding the plurality of generated samples into the teacher model to obtain the plurality of first statistics comprises: feeding the plurality of generated samples into the teacher model; and obtaining the plurality of first statistics based on outputs of a plurality of layers in the teacher model when the plurality of generated samples are passing through the teacher model.

In some embodiments, the outputs comprise one or more tensors generated by each layer of the teacher model, and the determining the plurality of first statistics based on the one or more tensors from each layer of the teacher model comprises; for each of the one or more tensors, determining one or more channel-level statistics; and aggregating the one or more channel-level statistics from all layers of the teacher model to obtain the plurality of first statistics.

In some embodiments, the one or more channel-level statistics comprise one or more of: a channel mean, a channel variance, and a channel k-th order moment where k is greater than two.

In some embodiments, the outputs comprise one or more tensors generated by each layer of the teacher model, and the plurality of first statistics comprise a joint-covariance of all channels in each of the one or more tensors.

In some embodiments, the feeding the plurality of training samples into the teacher model to obtain the plurality second statistics comprises: feeding the plurality of training samples into the teacher model; obtaining the plurality of second statistics based on outputs of a plurality of layers in the teacher model when the plurality of training samples are passing through the teacher model.

In some embodiments, the method may further include constructing the student model with a smaller number of parameters than the teacher model.

In some embodiments, the performing knowledge distillation from the teacher model to the student model using the trained generator comprises: generating a plurality of new training samples by using the trained generator; feeding the plurality of new training samples into the teacher model and the student model to obtain respective layer-level outputs of the teacher model and the student model; determining a distance between the layer-level outputs of the teacher model and the student model; and training the student model to minimize the distance.

In some embodiments, the layer-level outputs comprise feature vectors generated by embedding layers of the teacher model and embedding layers of the student model.

In some embodiments, the teacher model is a pre-trained neural network for image classification, and the plurality of training samples are labeled images.

In some embodiments, the teacher model is a pre-trained transformer for natural language processing.

In some embodiments, the student model is trained to perform classification based on one or more features of an input, and a data distribution of the plurality of new training samples with regarding to the one or more features is within a threshold distance from a data distribution of the plurality of training samples with regarding to the one or more features.

According to another aspect, a method for training a generator with few-shot learning and pivot samples may include: obtaining a plurality of training samples; randomly selecting a set of pivot samples from the plurality of training samples; based on the set of pivot samples, classifying the plurality of training samples to generate a set of groups of training samples respectively corresponding to the set of pivot samples; and training a generator for each of the set of groups of training samples for generating new samples, wherein a data distribution of the new samples is within a threshold distance from a data distribution of the group of training samples.

In some embodiments, the classifying the plurality of training samples to generate a set of groups of training samples respectively corresponding to the set of pivot samples comprises: generating pivot vector representations for the set of pivot samples; for each of the plurality of training samples, generating a vector representation; determining distances between the vector representation and each of the pivot vector representations; identifying one of the set of pivot samples corresponding to a pivot vector representation having a shortest distance to the vector representation; and grouping the training sample with the one pivot sample.

In some embodiments, the method may further include: receiving a pre-trained teacher model, wherein the training a generator for each of the set of groups of training samples for generating new samples comprises: initializing the generator; generating a plurality of samples using the generator; feeding the plurality of generated samples into the teacher model to obtain a plurality of first statistics; feeding the plurality of training samples into the teacher model to obtain a plurality second statistics; and training the generator to minimize a distance between the plurality of first statistics and the plurality of second statistics.

In some embodiments, the feeding the plurality of generated samples into the teacher model to obtain the plurality of first statistics comprises: feeding the plurality of generated samples into the teacher model; and obtaining the plurality of first statistics based on outputs of a plurality of layers in the teacher model when the plurality of generated samples are passing through the teacher model.

In some embodiments, the outputs comprise one or more tensors generated by each layer of the teacher model, and the determining the plurality of first statistics based on the one or more tensors from each layer of the teacher model comprises; for each of the one or more tensors, determining one or more channel-level statistics; and aggregating the one or more channel level statistics from all layers of the teacher model to obtain the plurality of first statistics.

In some embodiments, the outputs comprise one or more tensors generated by each layer of the teacher model, and the determining the plurality of first statistics based on the one or more tensors from each layer of the teacher model comprises; for each of the one or more tensors, determining one or more channel-level statistics; and aggregating the one or more channel level statistics from all layers of the teacher model to obtain the plurality of first statistics.

In some embodiments, the one or more channel-level statistics comprise one or more of: a channel mean, a channel variance, and a channel k-th order moment where k is greater than two.

In some embodiments, the outputs comprise one or more tensors generated by each layer of the teacher model, and the plurality of statistics comprise a joint-covariance of all channels in each of the one or more tensors.

In some embodiments, the method may further include constructing a student model with a smaller number of parameters than the teacher model; and performing knowledge distillation from the teacher model to a student model using the trained generators corresponding to the groups of training samples.

In some embodiments, the performing knowledge distillation from the teacher model to the student model using the trained generators comprises: generating a plurality of new training samples by using each of the trained generators; feeding the plurality of new training samples into the teacher model and the student model to obtain respective layer-level outputs of the teacher model and the student model; determining a distance between the layer-level outputs of the teacher model and the student model; and training the student model to minimize the distance.

In some embodiments, the layer-level outputs comprise feature vectors generated by embedding layers of the teacher model and embedding layers of the student model.

In some embodiments, the teacher model is a pre-trained neural network for image classification, and the plurality of training samples are labeled images.

In some embodiments, the teacher model is a pre-trained transformer for natural language processing.

According to yet another aspect, a system may comprise one or more processors and one or more non-transitory computer-readable memories coupled to the one or more processors and configured with instructions executable by the one or more processors to cause the system to perform any of the methods described herein.

According to still another aspect, a non-transitory computer-readable storage medium may be configured with instructions executable by one or more processors to cause the one or more processors to perform any of the methods described herein.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
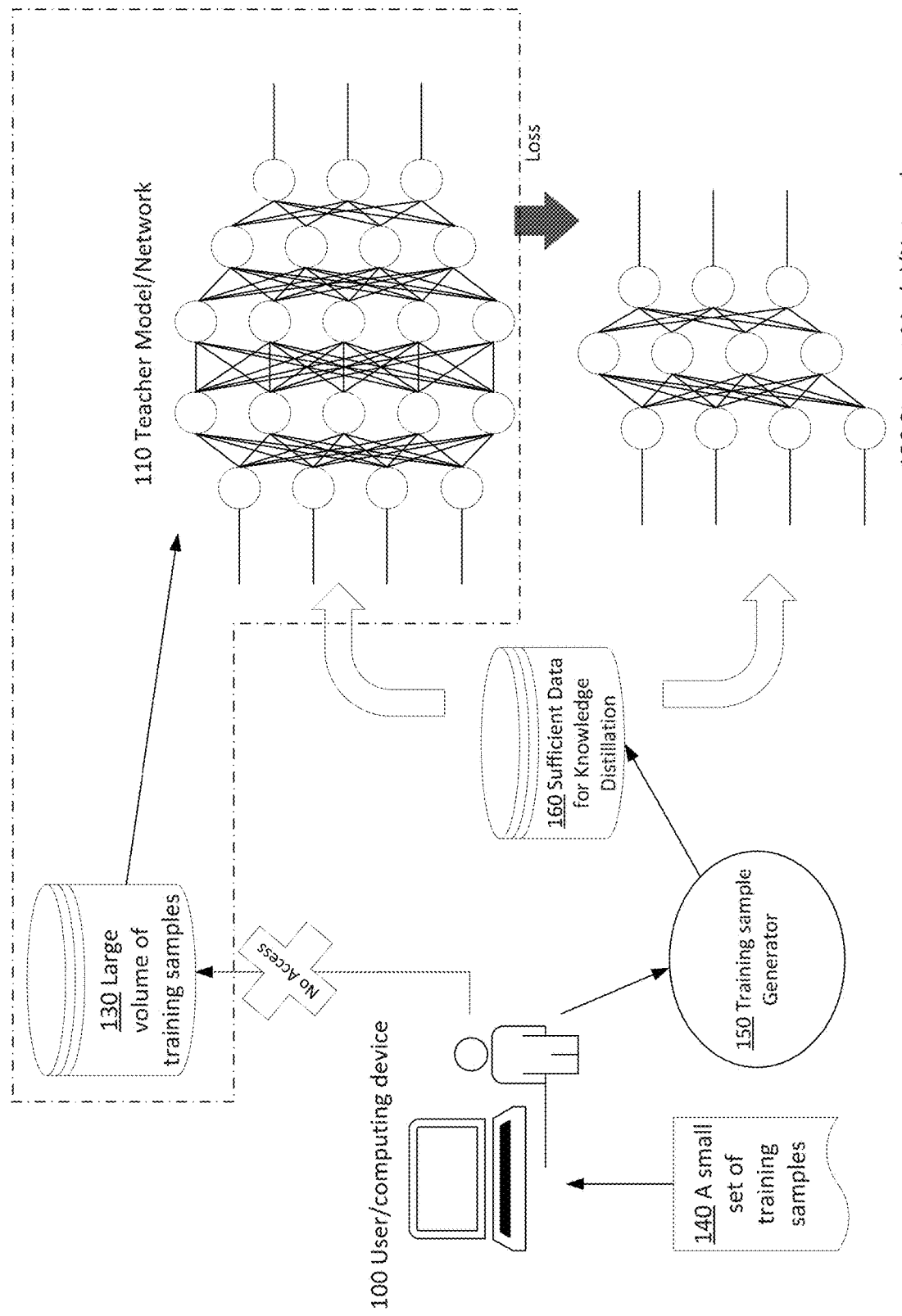
FIG. 1 illustrates an exemplary knowledge distillation process in accordance with various embodiments.

Embodiments described herein provide methods, systems, apparatus for training sample generators for knowledge distillation between a teacher model (a large machine learning model) and a student model (a small machine learning model). Knowledge distillation is one of the most popular and effective techniques for knowledge transfer and model compression. For example, a teacher model may be trained based on a large volume of original training samples and made available for users to download. After a user downloads the teacher model, it may not be able to deploy the bulky teacher model to less powerful devices such as mobile files or other edge devices. In this case, the user may train a smaller student model by transferring the knowledge from the teacher model for easy deployment and less maintenance cost. However, it is common that the user does not have access to sufficient training samples (e.g., the teacher model training entity may not share its training samples for data privacy, proprietary, or other reasons). In many cases, what the user has may be limited to a small set of self-developed training samples or a few training samples collected by him/herself when testing the teacher model.

This disclosure describes a novel approach to perform knowledge distillation when the available training samples are limited. This approach works because of the following findings: when the goal is to generate a large number of samples for model distillation, pruning or compression, it is unnecessary to generate high-reality samples, while the ability to generate samples of task-specific features is more important. For example, the teacher model may be trained based on a massive amount of training samples collected from numerous fields. Therefore, the teacher model may perform equally well in drastically different areas, such as classifying birds, classifying cars, classifying buildings, etc. However, the student model is usually more task-specific and may only focus on a specific use case, such as gender classification. In other words, the teacher model may look at thousands of features of an input and thus require millions of parameters, whereas the student model may only need to focus on a few dozens of features and thus have a much less number of parameters. To perform knowledge distillation to train the student model for gender classification, the generated samples can focus on the most relevant features and ignore other features. That is, the generated samples and the real samples should have similar data distribution with regarding only to the relevant features.

Based on the above-identified findings, a new training criteria (loss function) is designed to enable a few-shot learning-based generator training method. Here, "few-shot learning" refers to a type of machine learning mechanism where the training sample set is limited.

Some embodiments in this disclosure further address the issue when the limited training samples are collected from different domains, which may cause the new training criteria (loss function) to be inaccurate. The corresponding solution may be referred to as pivot-sample-based generator training.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

FIG. 1 illustrates an exemplary knowledge distillation process in accordance with various embodiments. The embodiments described in this disclosure may be implemented as a part of the illustrative knowledge distillation process in FIG. 1 or another suitable knowledge distillation or model compression process with limited training samples.

As shown, a teacher model 110 refers to a pre-trained machine learning model (e.g., a deep neural network or an ensemble of multiple small models) based on a large volume of training samples 130. The teacher model 110 may be trained by an entity with access to the large volume of training samples 130. The teacher model 110 may be intended to be powerful and be able to perform well in many different machine learning tasks, such as performing accurate classifications in different areas. The teacher model 110 may have a huge amount of parameters to learn latent relationships among the features of input data. As powerful the teacher model 110 is, it may be cumbersome for evaluation, deployment, and maintenance.

When a user 100 wants to use the teacher model 110, he or she may need to perform knowledge distillation to transfer the "knowledge" (the parameters for feature extraction, pattern recognition, etc.) of the teacher model 110 to a smaller student model 120. Generally, the knowledge distillation between the teacher model 110 and the student model 120 involves feeding same training samples to both models, and training the student model 120 to behave as close as the teacher model 110. Therefore, this process requires training samples. In practical, the user 100 may not have access to the large volume of training samples 130 due to lack of authority, data privacy, proprietary issues. What the user 100 has access may be limited to a small set of training samples 140, which may be obtained by the user 100 through self-development (e.g., for image classification, the user 100 may label images for training) or other suitable means. This small set of training samples 140 is insufficient to train the student model 120 to achieve a reasonable accuracy. Therefore, a training sample generator 150 may be trained to produce more (synthetic) training samples 160 to perform the knowledge distillation between the teacher model 110 and the student model 120.

The goal of the training sample generator 150 is to generate new training samples 160 with similar data distribution as the small set of training samples 140 with regarding to specific features relevant to the intended use of the student model 120. For instance, if the student model 120 is trained for gender classification, the small set of training samples 140 may include images of men and women that encompasses many different features (e.g., size, color, shape) of eyes, ears, noses, mouths, hairs, etc. Among these features, some are more relevant to gender, such as the hair length, whereas other features are less relevant, such as the color of eyes. The goal of the training sample generator 150 is to generate new training samples with similar data distribution as the real training samples (e.g., the small set of training samples 140 or the large volume of training samples 130) with regarding to the features relevant to gender classification, such as the hair length (and corresponding labels). The generated new training samples may have different data distribution as the real training samples with regarding to the features irrelevant to gender classification, such as the color of nose.

Figure 2:
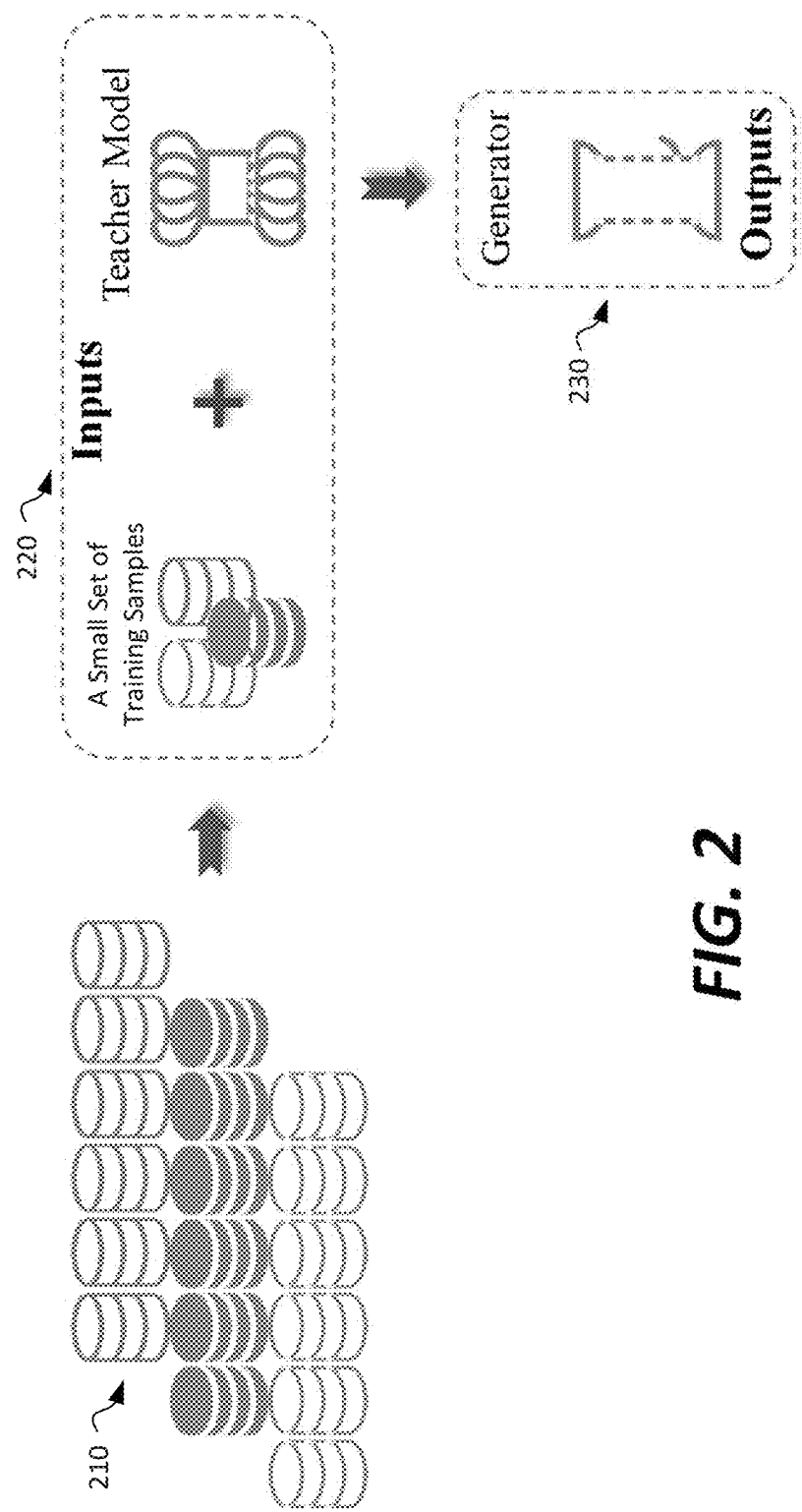
FIG. 2 illustrates an exemplary diagram for training a generator with few-shot learning in accordance with various embodiments.

FIG. 2 illustrates an exemplary diagram for training a generator 230 with few-shot learning in accordance with various embodiments. The generator 230 may be trained to generate synthetic samples for performing knowledge distillation between a teacher model and a student model.

As shown, when the large volume of real training samples 210 collected from real-world domains are not available for knowledge distillation, a small set of training samples and the teacher model may be collectively treated as an input 220 to train the generator 230. Here, the teacher model may be a pre-trained neural network for image classification or a pre-trained transformer for natural language processing obtained from another entity or online. The small set of training samples may refer to labeled training samples collected from real-word domains. This small set of training samples may or may not be a part of the large volume real training samples 210.

Figure 3:
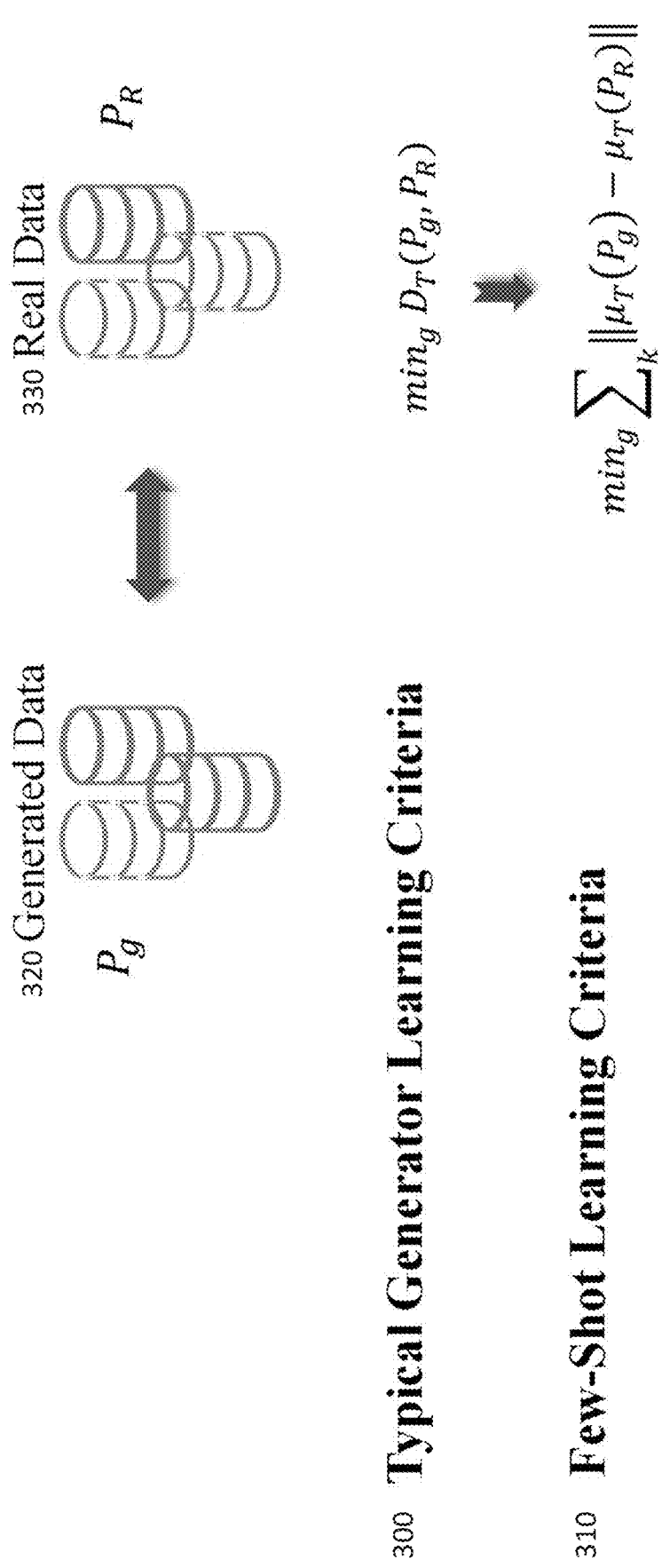
FIG. 3 illustrates an exemplary learning criteria for training a generator with few-shot learning in accordance with various embodiments.

FIG. 3 illustrates an exemplary learning criteria 310 for training a generator with few-shot learning in accordance with various embodiments. Here, the "learning criteria" may be also referred to as a loss function or an objective function used to train the generator. To further clarify the novelty of the new learning criteria 310, FIG. 3 illustrates a comparison between a typical (existing) generator learning criteria 300 and the new learning criteria 310 for few-shot learning-based generator training.

In existing solutions, the generator may be trained based on a large volume of real data $P_R$ 330. The training of the generator may involve tuning the parameters of the generator so that the generated data $P_g$ 320 have a similar data distribution as $P_R$ 330. For example, if the real data $P_R$ 330 contains a million of data samples, during a training cycle, a large number of generated (synthetic) samples $P_g$ 320 may be obtained by using the generator. The learning criteria 300 or the loss function indicates that data distribution distance $D_T$ between $P_g$ 320 and $P_R$ 330 should be minimized, e.g., smaller than a threshold. If this objective is not met yet, the parameters of the generator may be tuned to further reduce the data distribution distance $D_T$. The data distribution distance $D_T$ may be determined based on similarity matches. For example, for each data sample in $P_g$ 320, searching the real data $P_R$ 330 to identify a match (e.g., the distance between feature representations of the two samples is below a certain threshold). Depending on the number of matches found, the data distribution distance $D_T$ may be determined.

However, data distribution may accurately describe a data set only when the data set has a large number of data samples. If the data set is small, data distribution may not properly represent the data set. As described above, the real data $P_R$ 330 in many practical applications has only a few data samples.

As shown in FIG. 3, instead of relying on data distribution, the few-shot learning criteria 310 relies on statistics $\mu_T$ of the real data $P_R$ 330 and the generated data $P_g$ 320. In some embodiments, the statistics matrix $\mu_T$ of a data set (either the real data $P_R$ 330 or the generated data $P_g$ 320) may include the statistics of outputs generated by the teacher model when the data set is passing through the teacher model. The outputs may include each tensor generated at each layer of the teacher model. In some embodiments, the statistics matrix $\mu_T$ may include channel-level statistics of the tensors output from each layer of the teacher model. The channel-level statistics may include a channel mean, a channel variance, a channel k-th order moment where k is greater than two, another suitable check-level statistics, or any combination thereof. In some embodiments, the statistics matrix $\mu_T$ may include a joint-covariance of all channels in each of the tensors output at each layer of the teacher model. In FIG. 3, "k" refers to the k layers in the teacher model. Therefore, the few-shot learning criteria 310 may include a sum of distances between the statistics of tensors generated by each layer of the teacher model when the real data $P_R$ 330 and the generated data $P_g$ 320 are passing through the teacher model.

In some embodiments, the few-shot learning criteria 310 may be used as a loss function or an objective function for tuning parameters of the generator towards a direction to minimize this sum of the distances.

Figure 4:
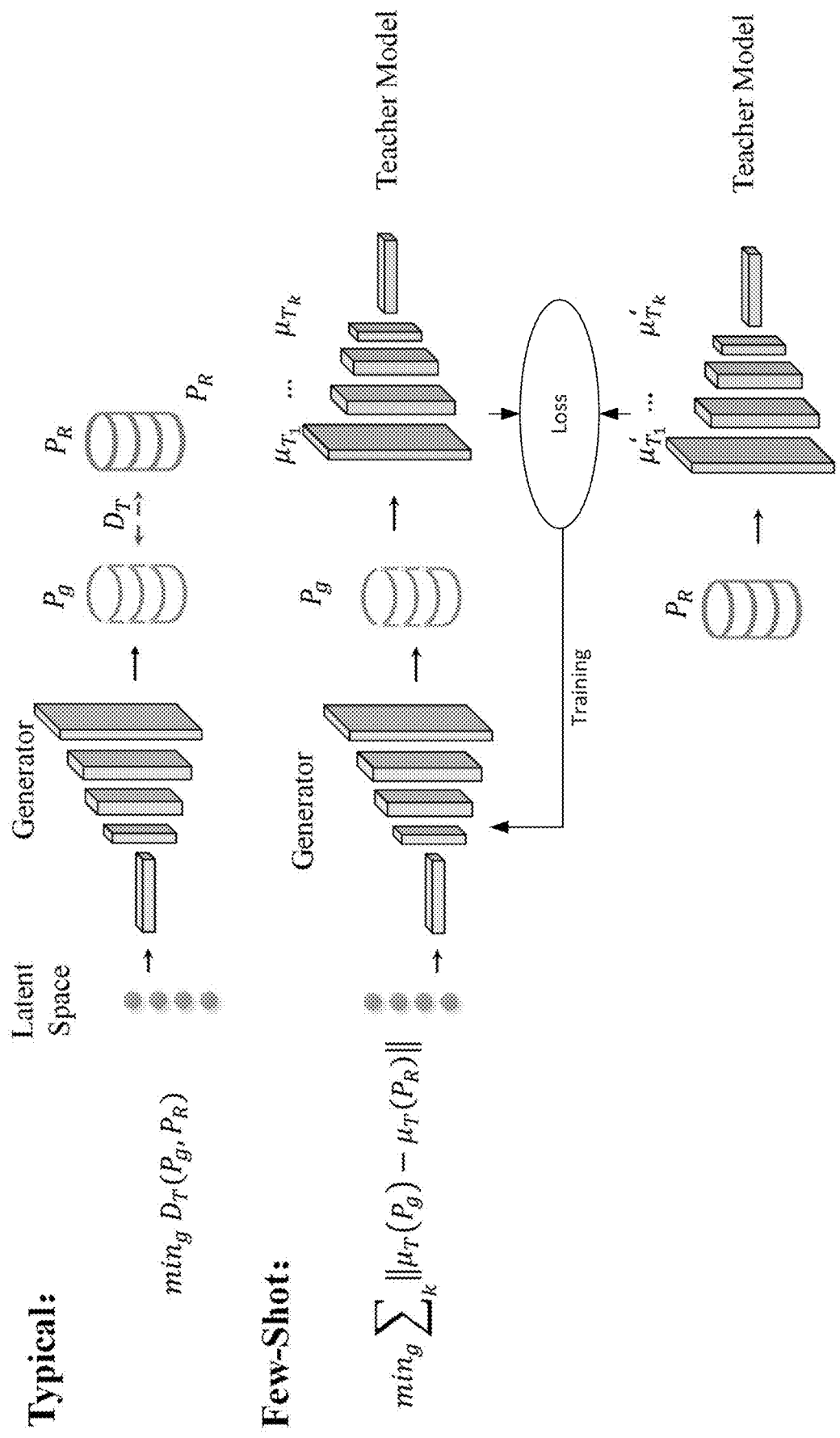
FIG. 4 illustrates an exemplary flow for training a generator with few-shot learning in accordance with various embodiments.

FIG. 4 illustrates an exemplary flow for training a generator with few-shot learning in accordance with various embodiments. The generator may be implemented as a neural network, a deep neural network, a Generative Adversarial network, or another suitable machine learning model. The generator may be trained to explore the latent space in a given set of real samples $P_R$ (also called target samples), and generate synthetic samples $P_g$ that resemble $P_R$. Here, the "resemblance" may refer to the data distribution resemblance between $P_g$ and $P_R$ with regarding to features relevant to the specific use of the training samples. For instance, if the training samples will be used for gender classification, only the data distribution of the features related to gender classification needs to be resembled (e.g., a similarity score is below a threshold) in $P_g$ and $P_R$.

Referring to FIG. 4, a comparison between a typical generator training and few-shot learning-based generator training is illustrated. Typical generator training approaches rely on the distance between the real training samples and the synthetic samples generated by the generator, and tune the parameters of the generator to minimize the distance. For example, a to-be-trained generator may first generate a plurality of generated synthetic samples $P_g$. The distance of data distribution in $P_g$ and the set of real/target training samples $P_R$ may be determined as $D_T$. This distance $D_T$ may be used as a loss to tune the parameters of the to-be-trained generator. In these data-distribution based approaches, the amount of data samples in $P_g$ and $P_R$ are needed to be large in order to use data distributions to represent the features of data sets.

While the above-described typical generator training approaches may be applied to a wide range of use cases in which the real training samples are sufficient, the few-shot learning-based generator training approach may be used for more specific use cases involving a pre-trained teacher model, such as knowledge distillation from the pre-trained teacher model to a smaller student model, pruning the pre-trained teacher model, or model compression of the pre-trained teacher model. In these use cases, the amount of real training samples is usually limited and thus the typical generator training approaches may not be applicable (e.g., data distribution is inaccurate for small data sets).

In some embodiments, the few-shot learning-based generator training may rely on (1) the real training samples, (2) the synthetic training samples generated by the generator, and (3) the teacher model. The generator may first generate a plurality of synthetic training samples $P_g$. Then the $P_g$ is fed into the teacher model to obtain a plurality of first statistics $\mu_{T_1} \ldots \mu_{T_k}$, where k refers to the number of layers in the teacher model. Similarly, $P_R$ is also fed into the teacher model to obtain a plurality of second statistics $\mu'_{T_1} \ldots \mu'_{T_k}$. The generator is then be trained based on a distance between the plurality of first statistics and the plurality of second statistics.

In some embodiments, the first statistics and the second statistics may be collected in the same way, except that they are collected in response to the input data being the synthetic/generated training samples $P_g$ and the real/target training samples $P_R$, respectively. For example, to the first statistics $\mu_{T_1} \ldots \mu_{T_k}$, $P_g$ may be fed into the teacher model one by one or in small batches. Each layer of the teacher model may perform operations like feature extraction, encoding, decoding, and other suitable operations. Thus each layer may generate output such as one or more tensors to be consumed by the next layer. In some embodiments, the first statistics $\mu_{T_1} \ldots \mu_{T_k}$ may be respectively collected based on the output generated by the k layers in the teacher model. For example, $\mu_{T_1}$ may be collected based on the one or more tensors generated by the first layer of the teacher model in response to input data from $P_g$. In some embodiments, $\mu_{T_1}$ include channel-level statistics of the one or more tensors, such as a channel mean, a channel variance, and a channel i-th order moment (i is greater than two) of each tensor. For instance, each tensor has a plurality of channels, a channel mean may refer to the mean value of all the values within a corresponding channel. In some embodiments, $\mu_{T_1}$ may include a joint-covariance of all channels in each of the one or more tensors generated by the first layer of the teacher model.

After obtaining the first statistics $\mu_{T_1} \ldots \mu_{T_k}$ and the second statistics $\mu'_{T_1} \ldots \mu'_{T_k}$, a distance between these two statistic matrix may be determined as the loss. The parameters of the generator may then be tuned to minimize this loss.

In some embodiments, the trained generator may generate a large number of synthetic samples for knowledge distillation from the teacher model to a smaller student model. For example, the student model may be initialized or constructed in a similar structure as the teacher model but with fewer parameters. The student model may be trained to resemble the teacher model in response to the synthetic samples generated by the trained generator. For example, the synthetic samples may be fed into the teacher model and the student model to obtain respective layer-level outputs of the teacher model and the student model. The distance between the respective layer-level outputs of the teacher model and the student model may be used as a loss to train the student model to minimize the distance. In some embodiments, the layer-level outputs include feature vectors generated by embedding layers of the teacher model and embedding layers of the student model.

Figure 5:
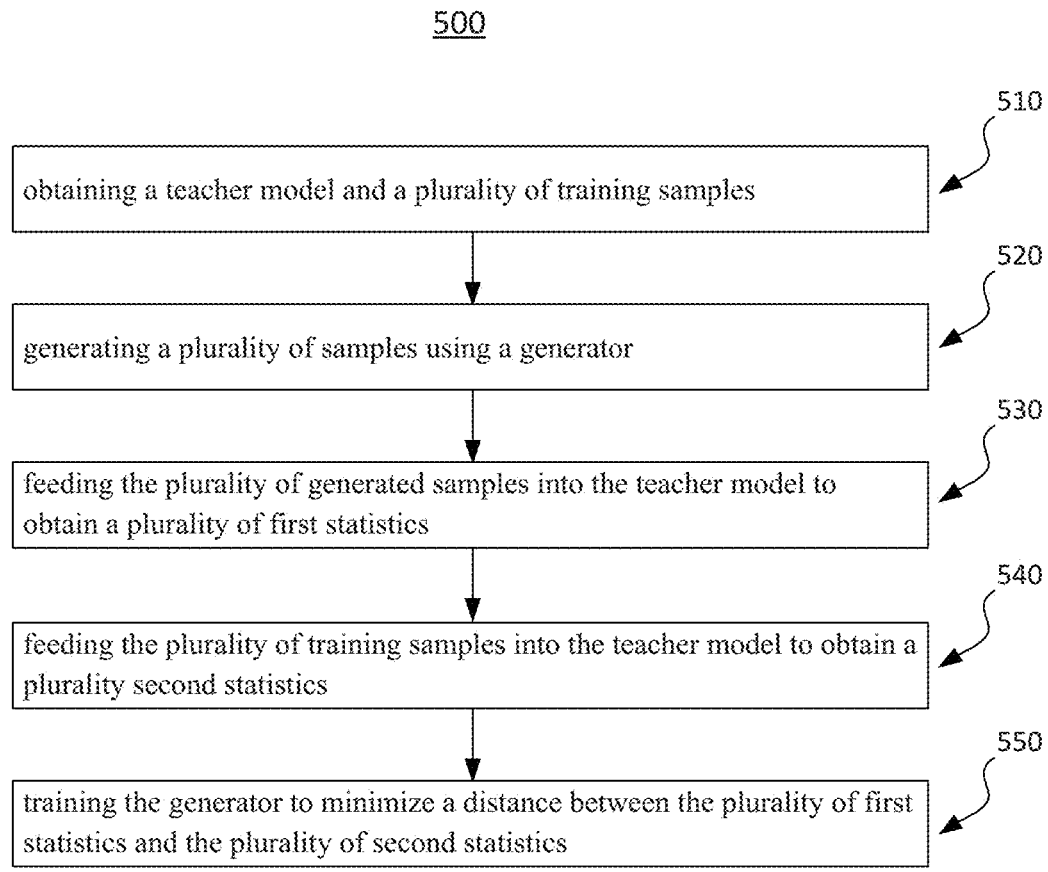
FIG. 5 illustrates an exemplary method for training a generator with few-shot learning in accordance with various embodiments.

FIG. 5 illustrates an exemplary method 500 for training a generator with few-shot learning in accordance with various embodiments. The method 500 may be performed by a device, apparatus, or system for optimizing resource allocation. The operations of the method 500 presented below are intended to be illustrative. Depending on the implementation, the method 500 may include additional, fewer, or alternative steps performed in various orders or in parallel.

Block 510 includes obtaining a teacher model and a plurality of training samples. In some embodiments, the teacher model is a pre-trained neural network for image classification, and the plurality of training samples are labeled images. In some embodiments, the teacher model is a pre-trained transformer for natural language processing.

Block 520 includes generating a plurality of samples using a generator.

Block 530 includes feeding the plurality of generated samples into the teacher model to obtain a plurality of first statistics. In some embodiments, the feeding the plurality of generated samples into the teacher model to obtain the plurality of first statistics comprises: feeding the plurality of generated samples into the teacher model; and obtaining the plurality of first statistics based on outputs of a plurality of layers in the teacher model when the plurality of generated samples are passing through the teacher model. In some embodiments, the outputs comprise one or more tensors generated by each layer of the teacher model, and the determining the plurality of first statistics based on the one or more tensors from each layer of the teacher model comprises; for each of the one or more tensors, determining one or more channel-level statistics; and aggregating the one or more channel-level statistics from all layers of the teacher model to obtain the plurality of first statistics. In some embodiments, the one or more channel-level statistics comprise one or more of: a channel mean, a channel variance, and a channel k-th order moment where k is greater than two. In some embodiments, the outputs comprise one or more tensors generated by each layer of the teacher model, and the plurality of first statistics comprise a joint-covariance of all channels in each of the one or more tensors.

Block 540 includes feeding the plurality of training samples into the teacher model to obtain a plurality second statistics. In some embodiments, the feeding the plurality of training samples into the teacher model to obtain the plurality second statistics comprises: feeding the plurality of training samples into the teacher model; obtaining the plurality of second statistics based on outputs of a plurality of layers in the teacher model when the plurality of training samples are passing through the teacher model.

Block 550 includes training the generator to minimize a distance between the plurality of first statistics and the plurality of second statistics.

In some embodiments, the method 500 may further include performing knowledge distillation from the teacher model to a student model using the trained generator. In some embodiments, the performing knowledge distillation from the teacher model to the student model using the trained generator comprises: generating a plurality of new training samples by using the trained generator; feeding the plurality of new training samples into the teacher model and the student model to obtain respective layer-level outputs of the teacher model and the student model; determining a distance between the layer-level outputs of the teacher model and the student model; and training the student model to minimize the distance. In some embodiments, the layer-level outputs comprise feature vectors generated by embedding layers of the teacher model and embedding layers of the student model.

In some embodiments, constructing the student model with a smaller number of parameters than the teacher model. In some embodiments, the student model is trained to perform classification based on one or more features of an input, and a data distribution of the plurality of new training samples with regarding to the one or more features is within a threshold distance from a data distribution of the plurality of training samples with regarding to the one or more features.

Figure 6A:
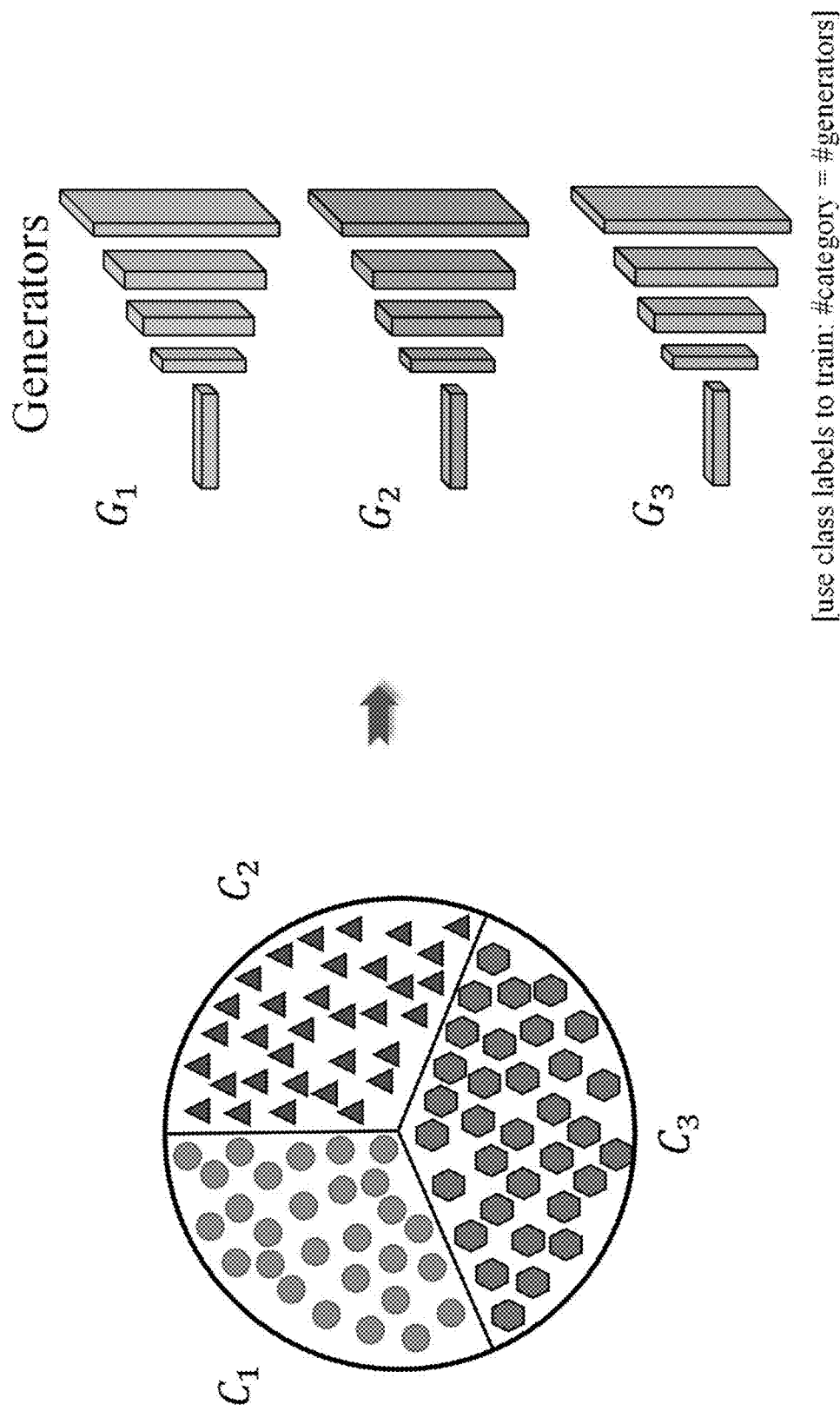
FIG. 6A illustrates an exemplary method for class-based generator training in accordance with various embodiments.

FIG. 6A illustrates an exemplary method for class-based generator training in accordance with various embodiments. There is a potential issue with the few-shot learning-based generator training (e.g., method 500) when the given set of real training samples are collected from diverse domains. As described above, the few-shot learning-based generator training relies on the statistics of the tensors generated by each layer of a teacher model, and the statistics include channel-level mean, channel-level variance, or other orders of moments (mean is a first-order moment, variance is a second-order moment). When the real training samples are from different domains, two intermediate tensors (e.g., tensors generated by the teacher model in response to two input samples from two domains) may have similar channel-level means (or variances), but it does not necessarily indicate that distribution of the values in these channels are similar as the relevant features of the input samples may be different. To address this issue, it is desirable to separate the real training samples into different groups, and train a generator for each group. Ideally, the training samples from a same class may be grouped together.

For example, for object classification use cases, the training samples may include different birds (class 1, denoted as $C_1$ in FIG. 6A), different cars (class 2, denoted as $C_2$ in FIG. 6A), and different buildings (class 3, denoted as $C_3$ in FIG. 6A). In some embodiments, the classes are known to the entity training the generators, and the real training samples are properly labeled to show classes. In these cases, the real training samples may be easily grouped based on class labels. For the groups $C_1$, $C_2$, and $C_3$, the training flow described in FIG. 4 and the method 500 in FIG. 5 may be applied to train corresponding generators, denoted as $G_1$, $G_2$, and $G_3$, respectively.

Figure 6B:
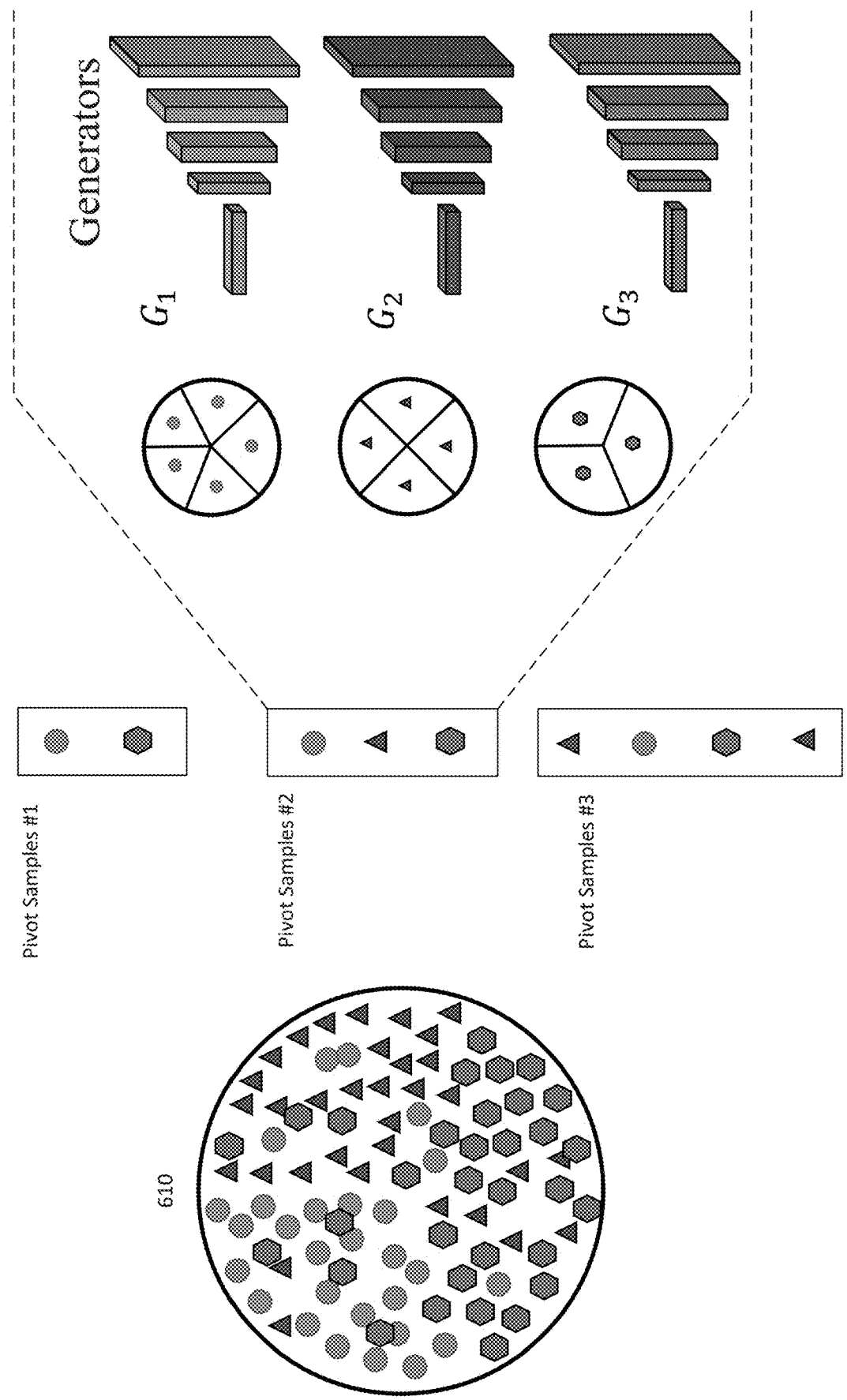
FIG. 6B illustrates an exemplary method for pivot-sample-based generator training in accordance with various embodiments.

FIG. 6B illustrates an exemplary method for pivot-sample-based generator training in accordance with various embodiments. For many practical machine learning tasks, the real training samples 610 cannot be grouped based on the classes because either the class labels are not available, or the concept of "class" does not even exist in the particular use case. For instance, the teacher model and the to-be-trained small student model are designed for regression (e.g., the model is trained for predicting a particular numerical value based on a set of prior data), detection, clustering (e.g., classes are unknown beforehand). In these cases, the class-based sample grouping described in FIG. 6A is not applicable.

As shown in FIG. 6B, one or more pivot samples may be randomly selected from the real training samples 610. Then the real training samples 610 may go through classification or clustering operations based on the pivot samples. The pivot samples may be treated as representatives of multiple groups. It is possible that two pivot samples are very similar, in which case they may represent the same group. Here, the "similarity" may be quantified based on a distance between vector representations of the two pivot samples.

As shown in FIG. 6B, the number of pivot samples directly affects the number of groups to be determined. A greater number of pivot samples means a greater number of groups, as well as a smaller number of real training samples in each group. If one group has a smaller number of real training samples, the training of the generator may suffer low accuracy. On the other hand, a smaller number of pivot samples means a smaller number of groups, with each group including a greater number of real training samples. However, it may cause one group having real training samples from different domains, which may also negatively affect the accuracy of the trained generator for that group. The determination of the number of pivot samples is a tradeoff evaluation between the number of groups and the number of real training samples in each group.

In some embodiments, an optimal set of pivot samples may be determined by an iterative process. For example, a first number of pivot samples may be randomly selected from the real training samples 610, and a distance between vector representations of every pair of the selected pivot samples may be obtained. Based on the distances, a first set of unique pivot samples may be identified from the first number of pivot samples. Here, the "unique pivot samples" may exclude the pivot samples that have distances smaller than a threshold from another pivot sample. Next, a second number of pivot samples may be randomly selected from the real training samples 610, and the above-described process may be executed against the first set of pivot samples to identify newly found unique pivot samples. The newly found unique pivot samples may be merged into the first set of unique pivot samples to form a new set of unique pivot samples. If the number of newly found unique pivot samples is below a threshold or no new unique pivot samples is found, the iterative process may stop. The new set of unique pivot samples may be the optimal set of pivot samples.

Figure 6C:
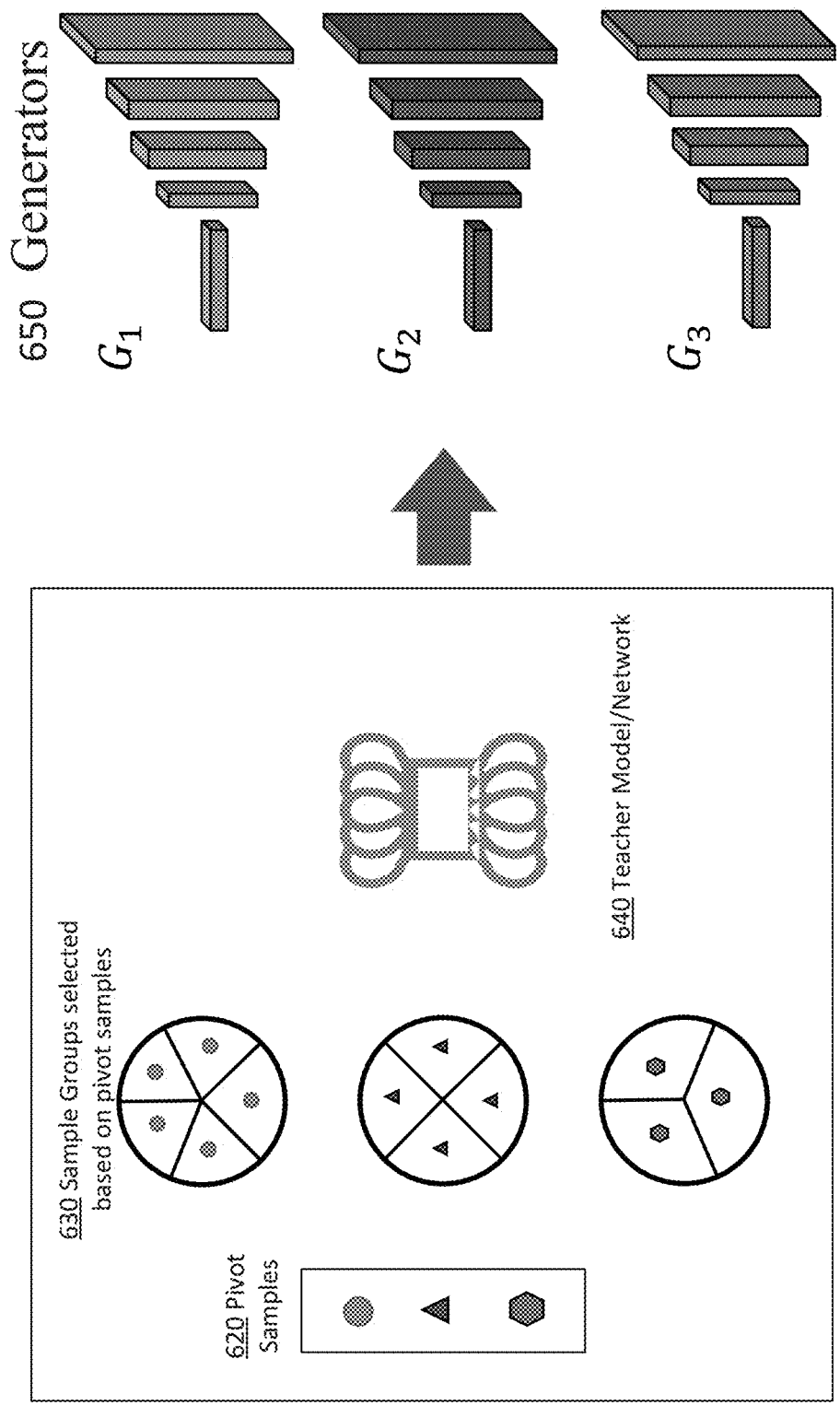
FIG. 6C illustrates an exemplary method training generators with few-shot learning and pivot samples in accordance with various embodiments.

FIG. 6C illustrates an exemplary method training generators with few-shot learning and pivot samples in accordance with various embodiments. After an optimal set of pivot samples 620 are selected and a pool of real training data are clustered into groups 630 corresponding to the pivot samples 620, the next step is to train the generators 650 for the groups 630. The method for training each generator 650 may adopt the training flow described in FIG. 4 and the method 500 in FIG. 5, in which a pre-trained teacher model 640 is required. In some embodiments, the goal of the generators 650 is to generate synthetic training samples for knowledge distillation from the pre-trained teacher model 640 into a plurality of smaller student models.

For example, for a given group 630 of real training samples, a corresponding generator 650 may be initialized. The generator 650 may generate a plurality of synthetic samples. Both the real training samples in the given group 630 and the generated synthetic samples may be fed into the teacher model 640 to obtain two sets of statistic matrixes. The distance between the two sets of statistic matrixes may be used as a loss to tune the parameters of the generator 650 to minimize the distance. In some embodiments, the statistic matrixes may include channel-level moments (e.g., mean, variance) of each tensor generated by each layer of the teacher model. After the generators 650 are trained, they may be used to generate a large number of synthetic samples to perform knowledge distillation from the teacher model 640 to student models. The student models respectively correspond to the generators 650.

Figure 7:
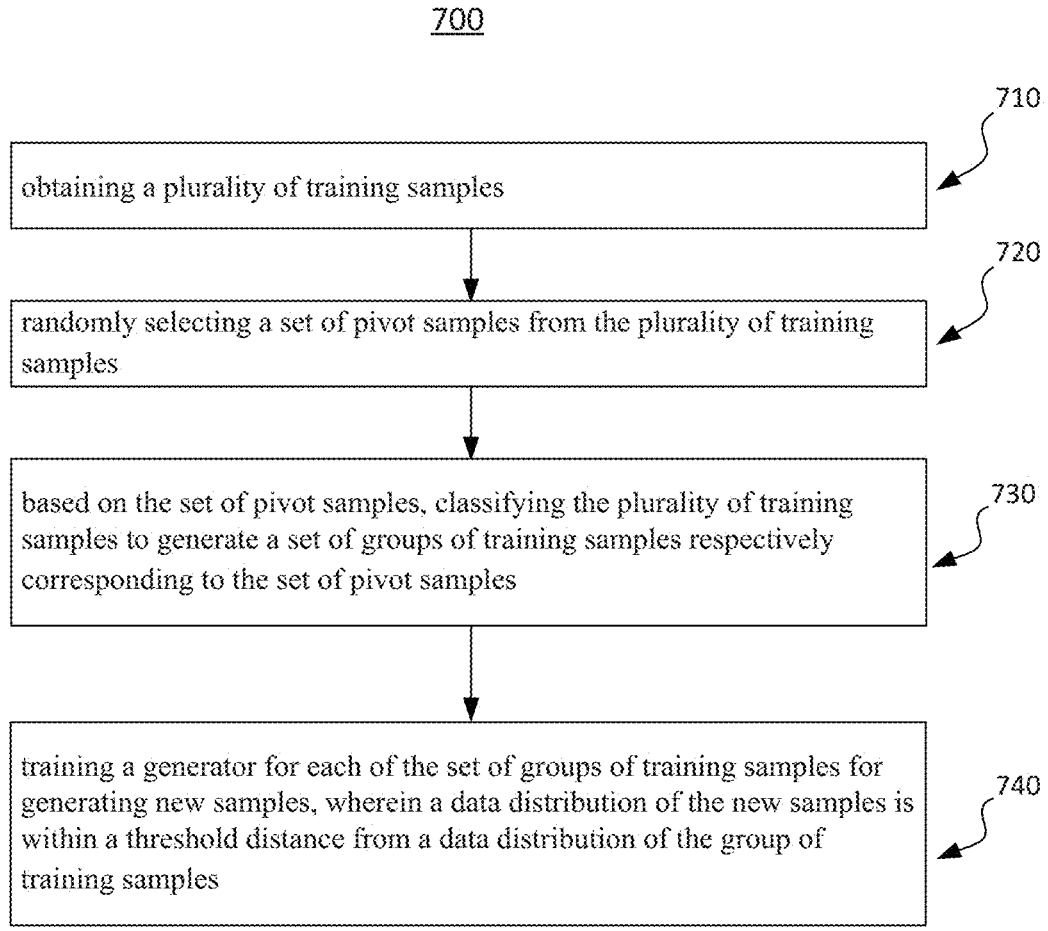
FIG. 7 illustrates an example method for training generators with pivot samples in accordance with various embodiments.

FIG. 7 illustrates an example method 700 for training generators with pivot samples in accordance with various embodiments. The method 700 may be performed by a device, apparatus, or system for optimizing resource allocation. The operations of the method 700 presented below are intended to be illustrative. Depending on the implementation, the method 700 may include additional, fewer, or alternative steps performed in various orders or in parallel.

Block 710 includes obtaining a plurality of training samples.

Block 720 includes randomly selecting a set of pivot samples from the plurality of training samples.

Block 730 includes, based on the set of pivot samples, classifying the plurality of training samples to generate a set of groups of training samples respectively corresponding to the set of pivot samples. In some embodiments, the classifying the plurality of training samples to generate a set of groups of training samples respectively corresponding to the set of pivot samples comprises: generating pivot vector representations for the set of pivot samples; for each of the plurality of training samples, generating a vector representation; determining distances between the vector representation and each of the pivot vector representations; identifying one of the set of pivot samples corresponding to a pivot vector representation having a shortest distance to the vector representation; and grouping the training sample with the one pivot sample.

Block 740 includes training a generator for each of the set of groups of training samples for generating new samples, wherein a data distribution of the new samples is within a threshold distance from a data distribution of the group of training samples.

In some embodiments, the method 700 may further include receiving a pre-trained teacher model, wherein the training a generator for each of the set of groups of training samples for generating new samples comprises: initializing the generator; generating a plurality of samples using the generator; feeding the plurality of generated samples into the teacher model to obtain a plurality of first statistics; feeding the plurality of training samples into the teacher model to obtain a plurality second statistics; and training the generator to minimize a distance between the plurality of first statistics and the plurality of second statistics. In some embodiments, the feeding the plurality of generated samples into the teacher model to obtain the plurality of first statistics comprises: feeding the plurality of generated samples into the teacher model; and obtaining the plurality of first statistics based on outputs of a plurality of layers in the teacher model when the plurality of generated samples are passing through the teacher model.

In some embodiments, the outputs comprise one or more tensors generated by each layer of the teacher model, and the determining the plurality of first statistics based on the one or more tensors from each layer of the teacher model comprises; for each of the one or more tensors, determining one or more channel-level statistics; and aggregating the one or more channel level statistics from all layers of the teacher model to obtain the plurality of first statistics. In some embodiments, the one or more channel-level statistics comprise one or more of: a channel mean, a channel variance, and a channel k-th order moment where k is greater than two. In some embodiments, the outputs comprise one or more tensors generated by each layer of the teacher model, and the plurality of statistics comprise a joint-covariance of all channels in each of the one or more tensors.

In some embodiments, the method 700 may further include: constructing a student model with a smaller number of parameters than the teacher model; and performing knowledge distillation from the teacher model to a student model using the trained generators corresponding to the groups of training samples. In some embodiments, the performing knowledge distillation from the teacher model to the student model using the trained generators comprises: generating a plurality of new training samples by using each of the trained generators; feeding the plurality of new training samples into the teacher model and the student model to obtain respective layer-level outputs of the teacher model and the student model; determining a distance between the layer-level outputs of the teacher model and the student model; and training the student model to minimize the distance. In some embodiments, the layer-level outputs comprise feature vectors generated by embedding layers of the teacher model and embedding layers of the student model. In some embodiments, the teacher model is a pre-trained neural network for image classification, and the plurality of training samples are labeled images. In some embodiments, the teacher model is a pre-trained transformer for natural language processing.

Figure 8:
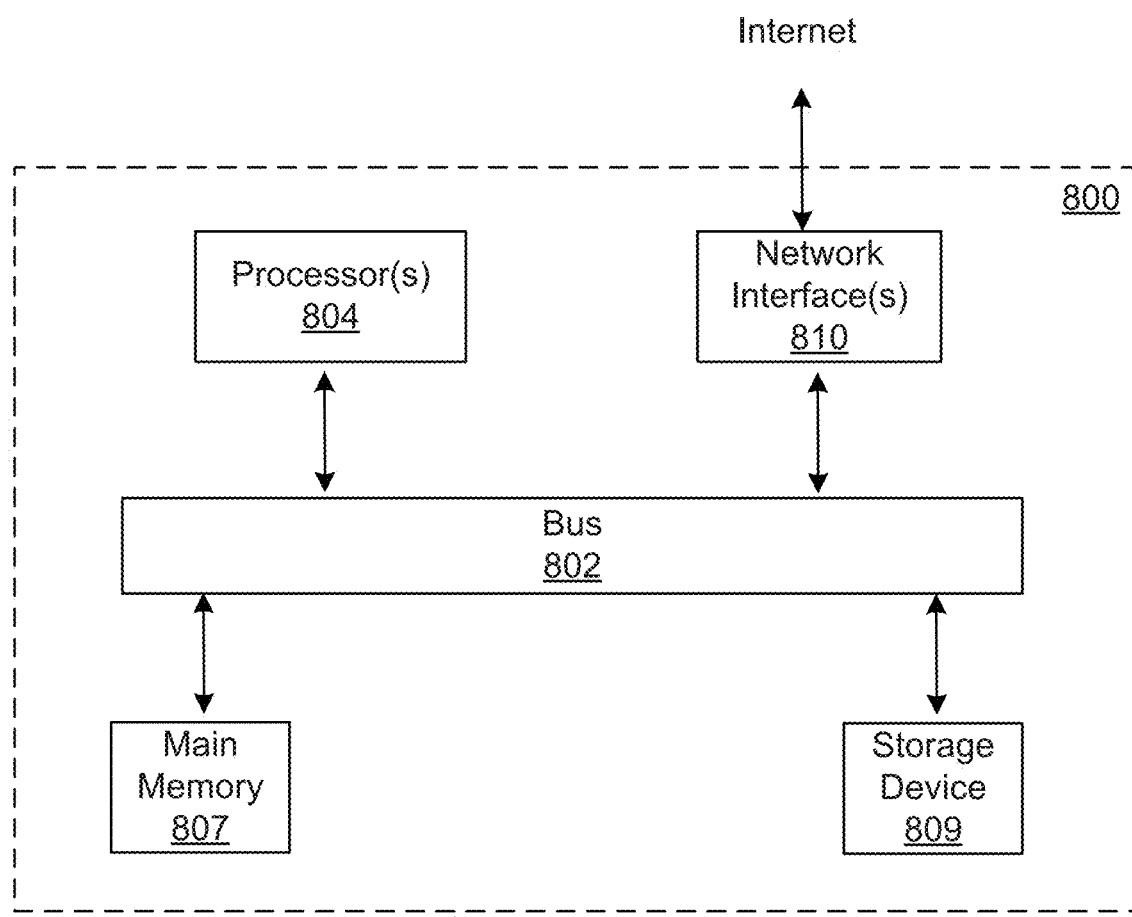
FIG. 8 illustrates an example computer system in which any of the embodiments described herein may be implemented.

FIG. 8 illustrates an example computing device in which any of the embodiments described herein may be implemented. The computing device may be used to implement one or more components of the systems and the methods shown in FIGS. 1-7. The computing device 800 may comprise a bus 802 or other communication mechanisms for communicating information and one or more hardware processors 804 coupled with bus 802 for processing information. Hardware processor(s) 804 may be, for example, one or more general-purpose microprocessors.

The computing device 800 may also include a main memory 807, such as random-access memory (RAM), cache and/or other dynamic storage devices, coupled to bus 802 for storing information and instructions to be executed by processor(s) 804. Main memory 807 also may be used for storing temporary variables or other intermediate information during execution of instructions to be executed by processor(s) 804. Such instructions, when stored in storage media accessible to processor(s) 804, may render computing device 800 into a special-purpose machine that is customized to perform the operations specified in the instructions. Main memory 807 may include non-volatile media and/or volatile media. Non-volatile media may include, for example, optical or magnetic disks. Volatile media may include dynamic memory. Common forms of media may include, for example, a floppy disk, a flexible disk, hard disk, solid-state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 800 may implement the techniques described herein using customized hard-wired logic, one or more ASICs or FPGAs, firmware and/or program logic which in combination with the computing device may cause or program computing device 800 to be a special-purpose machine. According to one embodiment, the techniques herein are performed by computing device 800 in response to processor(s) 804 executing one or more sequences of one or more instructions contained in main memory 807. Such instructions may be read into main memory 807 from another storage medium, such as storage device 809. Execution of the sequences of instructions contained in main memory 807 may cause processor(s) 804 to perform the process steps described herein. For example, the processes/methods disclosed herein may be implemented by computer program instructions stored in main memory 807. When these instructions are executed by processor(s) 804, they may perform the steps as shown in corresponding figures and described above. In alternative embodiments, hard-wired circuitry may be used in place of or in combination with software instructions.

The computing device 800 also includes a communication interface 810 coupled to bus 802. Communication interface 810 may provide a two-way data communication coupling to one or more network links that are connected to one or more networks. As another example, communication interface 810 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training samples to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

The invention claimed is:

1. A computer-implemented method for training a generator using few shot training by collecting statistics inside teacher models, and the method comprising:
    obtaining a teacher model and a plurality of training samples;
    generating a plurality of samples using the generator;
    feeding the plurality of generated samples into the teacher model to obtain a plurality of first statistics, wherein the plurality of first statistics are determined based on outputs of more than one layers in the teacher model when the plurality of generated samples are passing through the teacher model, wherein the outputs comprise one or more tensors generated by each of the more than one layers, and the plurality of first statistics are obtained by:
        for each of the one or more tensors, determining one or more channel-level statistics, wherein the one or more channel-level statistics comprise a channel mean, a channel variance, and an i-th order moment of all values within a corresponding channel in the tensor, i is greater than two;
    feeding the plurality of obtained training samples into the teacher model to obtain a plurality of second statistics, wherein the plurality of second statistics are determined based on outputs of the more than one layers in the teacher model when the plurality of obtained training samples are passing through the teacher model;
    training the generator by minimizing a distance between the plurality of first statistics and the plurality of second statistics; and
    generating new training samples using the trained generator for knowledge distillation from the teacher model to a student model, wherein the new training samples resemble the plurality of obtained training samples with regard to features related to an intended application of the student model, and are allowed to deviate from the plurality of obtained training samples with regard to features irrelevant to the intended application of the student model.

2. The method of claim 1, wherein the feeding the plurality of generated samples and the plurality of obtained training samples comprising:
    sequentially feeding the plurality of generated samples and the plurality of obtained training samples into the teacher model; or
    simultaneously feeding the plurality of generated samples into the teacher model and feeding the plurality of obtained training samples into a copy of the teacher model.

3. The method of claim 1, wherein the outputs comprise one or more tensors generated by each layer of the teacher model, and
    the determining the plurality of first statistics based on the one or more tensors from each layer of the teacher model comprises:
        for each of the one or more tensors, determining the one or more channel-level statistics; and
        aggregating the one or more channel-level statistics from all layers of the teacher model to obtain the plurality of first statistics.

4. The method of claim 3, wherein the one or more channel-level statistics further comprise one or more of:
    a channel mean and a channel variance.

5. The method of claim 1, wherein the outputs comprise one or more tensors generated by each layer of the teacher model, and
    the plurality of first statistics further comprise a joint-covariance of all channels in each of the one or more tensors.

6. The method of claim 1, further comprising:
    constructing the student model with a smaller number of parameters than the teacher model.

7. The method of claim 1, wherein the knowledge distillation from the teacher model to the student model comprises:
    feeding the new training samples into the teacher model and the student model to obtain respective layer-level outputs of the teacher model and the student model;
    determining a distance between the layer-level outputs of the teacher model and the student model; and
    training the student model to minimize the distance.

8. The method of claim 7, wherein the layer-level outputs comprise feature vectors generated by embedding layers of the teacher model and embedding layers of the student model.

9. The method of claim 1, wherein the teacher model is a pre-trained neural network for image classification, and the plurality of training samples are labeled images.

10. The method of claim 1, wherein the teacher model is a pre-trained transformer for natural language processing.

11. The method of claim 1, wherein the student model is trained to perform classification based on one or more features of an input, and
    a data distribution of the new training samples with regard to the one or more features is within a threshold distance from a data distribution of the plurality of training samples with regard to the one or more features.

12. A system for training a generator using few shot training by collecting statistics inside teacher models, the system comprising one or more processors and one or more non-transitory computer-readable memories coupled to the one or more processors and configured with instructions executable by the one or more processors to cause the system to perform operations comprising:

obtaining a teacher model and a plurality of training samples;

generating a plurality of samples using the generator;

feeding the plurality of generated samples into the teacher model to obtain a plurality of first statistics, wherein the plurality of first statistics are determined based on outputs of more than one layers in the teacher model when the plurality of generated samples are passing through the teacher model, wherein the outputs comprise one or more tensors generated by each of the more than one layers, and the obtaining of the plurality of first statistics comprises:

for each of the one or more tensors, determining one or more channel-level statistics, wherein the one or more channel-level statistics comprise a channel mean, a channel variance, and an i-th order moment of all values within a corresponding channel in the tensor, i is greater than two;

feeding the plurality of obtained training samples into the teacher model to obtain a plurality of second statistics, wherein the plurality of second statistics are determined based on outputs of the more than one layers in the teacher model when the plurality of obtained training samples are passing through the teacher model;

training the generator by minimizing a distance between the plurality of first statistics and the plurality of second statistics; and generating new training samples using the trained generator for knowledge distillation from the teacher model to a student model, wherein the new training samples resemble the plurality of obtained training samples with regard to features related to an intended application of the student model, and are allowed to deviate from the plurality of obtained training samples with regard to features irrelevant to the intended application of the student model.

13. The system of claim 12, wherein the feeding the plurality of generated samples and the plurality of obtained training samples comprising:

sequentially feeding the plurality of generated samples and the plurality of obtained training samples into the teacher model; or simultaneously feeding the plurality of generated samples into the teacher model and feeding the plurality of obtained training samples into a copy of the teacher model.

14. The system of claim 12, wherein the knowledge distillation from the teacher model to the student model comprises:

feeding the new training samples into the teacher model and the student model to obtain respective layer-level outputs of the teacher model and the student model;

determining a distance between the layer-level outputs of the teacher model and the student model; and training the student model to minimize the distance.

15. A non-transitory computer-readable storage medium for training a generator using few shot training by collecting statistics inside teacher models, the storage medium being configured with instructions executable by one or more processors to cause the one or more processors to perform operations comprising:

obtaining a teacher model and a plurality of training samples;

generating a plurality of samples using the generator;

feeding the plurality of generated samples into the teacher model to obtain a plurality of first statistics, wherein the plurality of first statistics are determined based on outputs of more than one layers in the teacher model when the plurality of generated samples are passing through the teacher model, wherein the outputs comprise one or more tensors generated by each of the more than one layers, and the obtaining of the plurality of first statistics comprises:

for each of the one or more tensors, determining one or more channel-level statistics, wherein the one or more channel-level statistics comprise a channel mean, a channel variance, and an i-th order moment of all values within a corresponding channel in the tensor, i is greater than two;

feeding the plurality of obtained training samples into the teacher model to obtain a plurality of second statistics, wherein the plurality of second statistics are determined based on outputs of the more than one layers in the teacher model when the plurality of obtained training samples are passing through the teacher model;

training the generator by minimizing a distance between the plurality of first statistics and the plurality of second statistics; and generating new training samples using the trained generator for knowledge distillation from the teacher model to a student model, wherein the new training samples resemble the plurality of obtained training samples with regard to features related to an intended application of the student model, and are allowed to deviate from the plurality of obtained training samples with regard to features irrelevant to the intended application of the student model.

16. The storage medium of claim 15, wherein the feeding the plurality of generated samples and the plurality of obtained training samples comprising:

sequentially feeding the plurality of generated samples and the plurality of obtained training samples into the teacher model; or simultaneously feeding the plurality of generated samples into the teacher model and feeding the plurality of obtained training samples into a copy of the teacher model.

17. The storage medium of claim 15, wherein the knowledge distillation from the teacher model to the student model comprises: feeding the new training samples into the teacher model and the student model to obtain respective layer-level outputs of the teacher model and the student model; determining a distance between the layer-level outputs of the teacher model and the student model; and training the student model to minimize the distance.

* * * * *

UNITED STATES PATENT AND TRADEMARK OFFICE
CERTIFICATE OF CORRECTION

PATENT NO. : 11,599,794 B1
APPLICATION NO. : 17/506317
DATED : March 7, 2023
INVENTOR(S) : Enxu Yan It is certified that error appears in the above-identified patent and that said Letters Patent is hereby corrected as shown below:

On the Title Page

In the (57) ABSTRACT:
"Methods, systems, and apparatus, including computer programs encoded on computer storage media, for few-shot learning-based generator training are disclosed. An exemplary method may start with obtaining a teacher model and a plurality of training samples, as well as a generator for generating more training samples. After generating a plurality of additional training samples using the method may continue with feeding the plurality of generated additional training samples into the teacher model to obtain a plurality of first statistics; and feeding the plurality of training samples into the teacher model to obtain a plurality second statistics. Then the method further includes training the generator to minimize a distance between the plurality of first statistics and the plurality of second statistics."

Should read:
-- Methods, systems, and apparatus, including computer programs encoded on computer storage media, for few-shot learning-based generator training are disclosed. An exemplary method may start with obtaining a teacher model and a plurality of training samples, as well as a generator for generating more training samples. After generating a plurality of additional training samples using the generator the method may continue with feeding the plurality of generated additional training samples into the teacher model to obtain a plurality of first statistics; and feeding the plurality of training samples into the teacher model to obtain a plurality second statistics. Then the method further includes training the generator to minimize a distance between the plurality of first statistics and the plurality of second statistics. --

Signed and Sealed this
Thirtieth Day of May, 2023

Katherine Kelly Vidal
*Director of the United States Patent and Trademark Office*